US011941454B1

(12) United States Patent
Gupta et al.

(10) Patent No.: US 11,941,454 B1
(45) Date of Patent: Mar. 26, 2024

(54) DYNAMICALLY MODIFYING BLOCK-STORAGE VOLUMES USING WORKLOAD CLASSIFICATIONS

(71) Applicant: Amazon Technologies, Inc., Seattle, WA (US)

(72) Inventors: Mohit Gupta, Seattle, WA (US); Letian Feng, Clyde Hill, WA (US); Leslie Johann Lamprecht, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 648 days.

(21) Appl. No.: 17/115,617

(22) Filed: Dec. 8, 2020

(51) Int. Cl.
*G06F 9/50* (2006.01)
*G06F 3/06* (2006.01)
*G06F 9/455* (2018.01)

(52) U.S. Cl.
CPC ........ *G06F 9/5077* (2013.01); *G06F 9/45533* (2013.01); *G06F 9/5011* (2013.01); *G06F 9/5044* (2013.01); *G06F 3/0604* (2013.01); *G06F 3/064* (2013.01); *G06F 3/067* (2013.01); *G06F 2009/45579* (2013.01); *G06F 9/50* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 10,671,309 B1 | 6/2020 | Glynn | |
| 11,592,989 B1 | 2/2023 | Gupta | |
| 2012/0124319 A1 | 5/2012 | Kirvan | |
| 2013/0111035 A1* | 5/2013 | Alapati | G06F 9/5072 709/226 |
| 2016/0283139 A1 | 9/2016 | Brooker | |
| 2017/0255409 A1* | 9/2017 | Brooker | G06F 3/0604 |

(Continued)

OTHER PUBLICATIONS

Venkataraman et al., "Ernest: Efficient Performance Prediciton for Large-Scale Advanced Analytics", Mar. 16-18, 2016, USENIX. (Year: 2016).*

(Continued)

*Primary Examiner* — Qing Yuan Wu
(74) *Attorney, Agent, or Firm* — Knobbe, Martens, Olson & Bear, LLP

(57) ABSTRACT

Features are disclosed for correlating a workload type with particular volume characteristics for a block storage volume. The volume characteristics may include a durability or a performance consistency for a particular volume. A computing device can obtain a set of workload parameters indicating a workload associated with a particular block storage volume. Based on the set of workload parameters, the computing device can determine a workload classification that links the set of workload parameters to a set of volume characteristics. The computing device can further compare the set of volume characteristics with the current set of volume characteristics for the block storage volume. Based on comparing the sets of volume characteristics, the computing device may determine a recommendation for a user. The computing device can dynamically modify the block storage volume based on the recommendation.

23 Claims, 5 Drawing Sheets

(56) References Cited

U.S. PATENT DOCUMENTS

2019/0334785 A1   10/2019   Penar

OTHER PUBLICATIONS

Alipourfard et al., "CherryPick: Adaptively Unearthing the Best Cloud Configurations for Big Data Analytics", Mar. 27-29, 2017, USENIX. (Year: 2017).*
Hsu et al., "Arrow: Low-Level Augmented Bayesian Optimization for Finding the Best Cloud VM", 2018, IEEE. (Year: 2018).*
Hsu et al., "Micky: A Cheaper Alternative for Selecting Cloud Instances", 2018, IEEE. (Year: 2018).*

* cited by examiner

| Workload Classification | Workload Type | Environment | Set of Volume Characteristics | Percent of Users | Users | Latency | IOPS | Durability |
|---|---|---|---|---|---|---|---|---|
| 1 | Web Server | Production | 1 | 25% | 25-50 | 10 ms | 8.6 | 99.997% |
| | | | 2 | 24% | N/A | 0.1 ms | 0.9 | 99.99% |
| | | | 3 | 23.8% | >500 | 2.5 ms | 10.1 | 99.999% |
| 2 | Database | Production | 1 | 51% | 100 | 0 ms | 6.5 | 99.9999% |
| | | | 2 | 49% | 250 | 0.001 ms | 4.5 | 99.993% |
| 3 | Customer Facing Application | Production | 1 | 100% | 10-15 | 20 ms | 9.1 | 99.9199% |
| 4 | Online Gaming | Pre-Production | 1 | 33% | <100 | 4 ms | 4.3 | 99.9% |
| | | | 2 | 33% | 5-100 | 25 ms | 7.8 | 99.95% |
| 5 | Machine Learning | Pre-Production | 1 | 40% | >100 | 2 ms | 2.1 | 99.99% |

DYNAMICALLY MODIFYING BLOCK-STORAGE VOLUMES USING WORKLOAD CLASSIFICATIONS

BACKGROUND OF THE INVENTION

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise. For example, a user can periodically reconfigure their available computing resources to obtain access to more, less, or different computing resources. This dynamic nature of network-based computing services, in contrast to a relatively static infrastructure of on-premises computing environments, requires a system architecture that can reliably re-allocate its hardware according to the changing needs of its user base.

Clouds service providers can provide computing resources in a variety of forms, which may be combined by users to provide desired functions or services. For example, a cloud provider can provide compute resources, like virtual machines, that conduct computations, block storage resources that act as virtual storage drives for compute resources, object storage services that act as network-accessible data stores, and the like. A cloud service provider may manage the underlying hardware supporting such services, such that an end user need not do so.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 3 depicts an illustrative visualization of a set of workload classifications for a block storage volume acting as a virtualized disk drive to a virtual machine instance on the cloud provider network of FIG. 1, which may be used to provide consistent performance when accessing the block storage volume.

DETAILED DESCRIPTION

Figure 1:
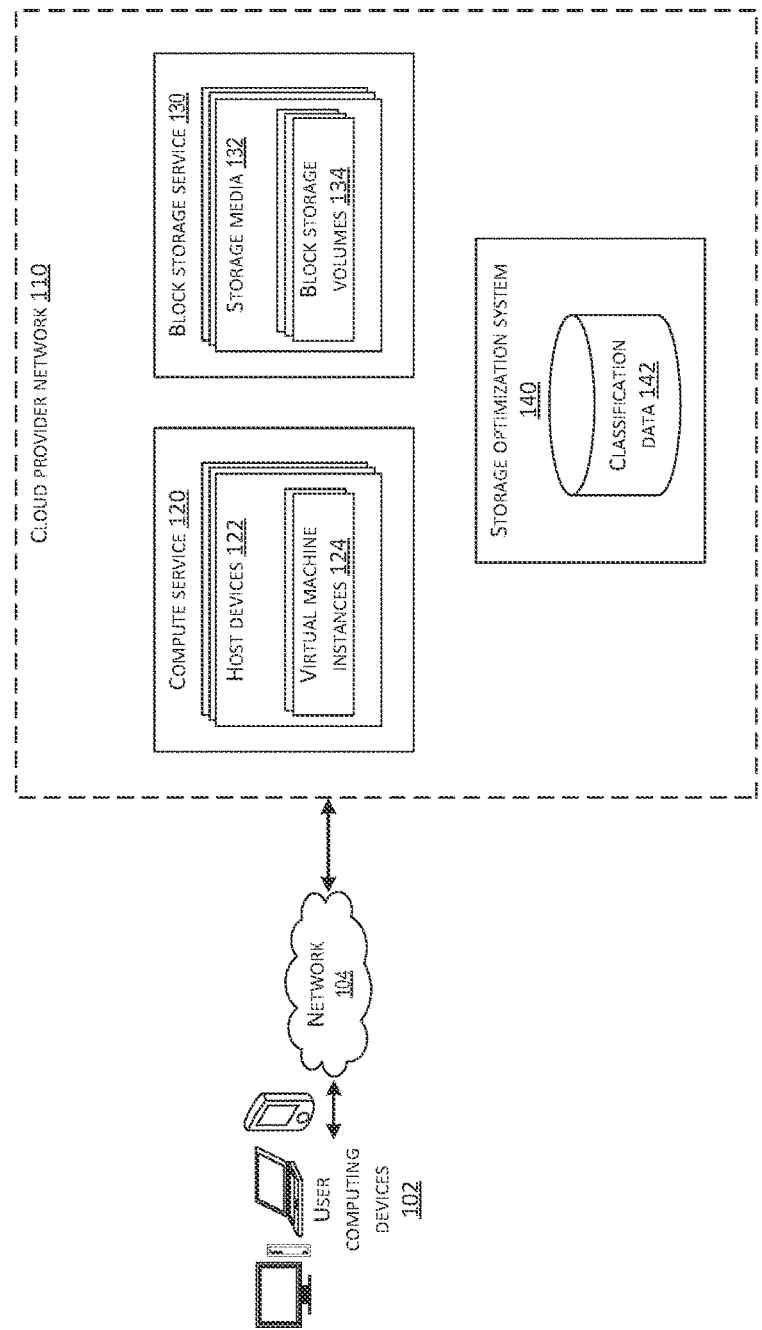
FIG. 1 depicts a schematic diagram of a cloud provider network in which various embodiments according to the present disclosure can be implemented to determine a recommended modification of block storage volumes, which recommendations are based on workload classifications.

Generally described, aspects of the present disclosure relate to dynamically modifying block-storage volumes in cloud computing environments based on a classification of a workload associated with the block-storage volumes. A block storage volume may act as a virtualized storage drive for a virtual machine ("VM") instance, enabling that VM instance to perform certain operations such as reading from and writing to the volume as if the volume were physically coupled to the instance. However, particularly in the context of cloud computing, the block storage volume may not be physically coupled to the instance, or even to the host computing device physically hosting the instance. Instead, the block storage volume may be connected to the VM instance via a network, and another device (e.g., software executing on the host computing device) may facilitate interaction between the VM instance and the block storage volume such that the VM instance can treat the block storage volume as local. Moreover, rather than being a physical drive, the block storage volume may be a logical volume implemented on one or more underlying physical drives, which drives may vary among bock storage volumes or even the same storage volume. Further, the block storage volume may be implemented according to a certain set of volume characteristics. For example, a block storage volume may have a particular volume type or a particular volume size.

A user of the virtual machine can request the provisioning or allocation of block storage volumes with particular volume characteristics in order to support computing workloads on behalf of the user. As described herein, a workload is implemented by a designated set of computing resources and the workload itself can be considered as code or logic that performs functionality using the computing resources. The particular volume characteristics for a particular block storage volume may correspond to the requirements of a user of the block storage volume (e.g., the workload that the user desires to implement for the block storage volume). The volume characteristics may include one or more of a volume type, a volume size, an average input/output operations per second ("IOPS"), an average seek time, an average raw read speed, an average raw write speed, an average request latency, a number of pending input/output operations, a random read speed, a random write speed, a sequential read speed, a max sustained IOPS, a max burst IOPS, one or more supported protocols, a durability, a performance consistency, etc. For example, a user with a VM instance with a particular workload that works well on a storage device providing high sequential read speeds but low random read speeds, may desire to implement a block storage volume with particular volume characteristics such as those typical of a magnetic spinning disk drive. Therefore, the user may review the various volume characteristics associated with block storage volumes and select one or more volume characteristics for the user's workload.

In light of the different workloads that are supported on behalf of users, the cloud provider network may provide users with a selection of a variety of types of block storage volumes optimized to support different workloads. For example, different types of block storage volumes may have different durability (e.g., failure rates) and different performance consistency (e.g., the rate at which the block storage volume performs as provisioned). Generally, the different types of block storage volumes may each be advantageous in certain situations. For example, a first type of block storage volume (e.g., a solid state drive ("SSD") provisioned with a dedicated inputs/outputs per second ("IOPS") capacity) may be more advantageous for latency-sensitive transactional workloads and a second type of block storage volume (e.g., an SSD provisioned without a dedicated IOPS capacity) may be more advantageous for cost-conscious workloads. Generally, each type of block storage volume may be allocated a different amount of computing resources, and/or different combination of computing resources, such that the types of block storage volumes are optimized, or computationally biased, to support different workloads. As used herein, computing resources refers to compute, memory, storage, networking, and, in some implementations, graphics processing. In this way, users can receive a recommendation identifying a type of block storage volume that is more optimized to support their workload, thereby increasing the performance of the workload while reducing underutilization of computing resources by the cloud provider network.

However, the workload of the user may change with respect to the block storage volume. For example, the workload of the user may vary to require high random read speeds more suited to an SSD. As the workload changes, the initial block storage volume may provide inconsistent or inadequate performance. For example, when a user attempts to implement a workload that demands high random read speeds on a volume backed by magnetic storage, the user may experience delays. Additionally, the workload and the volume characteristics may be misconfigured such that the block storage volume provides a sub-optimal experience. This inconsistent performance leads to inconsistent and inadequate user experiences, requires the user to perform multiple modifications of the block storage volume to identify the optimal volume characteristics, and is generally detrimental to the goal of enabling users to dynamically modify their usage of the block storage volume without causing performance issues in the block storage volume.

Embodiments of the present disclosure address these problems by enabling modification of block storage volumes based on a workload classification (also referred to herein as a volume classification). Such a modification can reduce or eliminate performance issues, due, for example, to block storage volumes that are misconfigured or sub-optimal for the workload being implemented on the block storage volumes. More specifically, embodiments of the present disclosure enable the dynamic modification of a block storage volume, based on the workload classification of the workload, by determining that a particular set of volume characteristics are the optimal volume characteristics for a particular workload. In order to provide optimal performance, the block storage volume can be modified to match a different set of volume characteristics associated with the workload. Thus, the block storage volume may be dynamically modified based on the workload classification the block storage volume.

The workload of the block storage volume may be defined using one or more workload parameters associated with the workload. Accordingly, the storage optimization system may deliver a managed experience, such as a step-by-step process, that allows new users to describe their workload using language and terminology (e.g., workload parameters) that the new user understands, and then provides the user with recommendations for VM instance type(s) optimized for their workload. In some examples, the storage optimization system may include a wizard that is accessible to a new user via their user account and presents user interfaces to the user that are configured to receive input data that defines that user's workload. The wizard may present user interface(s) that include text-input fields to receive a textual description of a workload from a user, or fields with a drop-down menu that include answers for a question regarding the workload of the user, such that a user can answer high-level questions about their workloads. For example, the wizard may present the user with questions such as "is your workload a publicly facing website," or "how many visitors do you expect per day?". The storage optimization system may use the input received from the user to classify the workload as belonging to a predefined workload category (e.g., web-server category, database category, compute-heavy category, etc.), and provide the user account with a listing of recommended VM instance types to support their workload.

In some embodiments, the storage optimization system may determine a set of observable parameters (e.g., workload parameters) that define the workload. One or more of the user computing devices 102, the block storage volume 134, the block storage service 130, or any other component of the example computing environment 100 may observe the set of observable parameters. Further, the set of observable parameters may include one or more of a volume configuration, a volume type, a tag, a volume size, an IOPS per volume, a throughput, a number of pending input/output operations, utilization data of the virtual machine instance, memory associated with the virtual machine instance, the network type, an operating system associated with the virtual machine instance, virtual machine instance tags, network bandwidth, central processing units ("CPU") consumption of the virtual machine instance, graphics processing units ("GPU") consumption of the virtual machine instance, additional parameters associated with the virtual machine instance, additional parameters associated with the block storage volume, etc.

Further, the storage optimization system may group or classify the set of workload parameters into a workload classification of a plurality of workload classifications. In order to group the set of workload parameters into a workload classification, the storage optimization system may obtain a plurality of workload classifications and compare the workload parameters associated with the block storage volume to workload parameters associated with each workload classification of the plurality of workload classifications. By comparing the workload parameters to the workload parameters associated with each workload classification, the storage optimization system can determine a workload classification associated with the workload. By classifying the workload of the block storage volume, the storage optimization can recommend a set of volume characteristics (e.g., a durability and/or a performance consistency) of the block storage volume that can provide an optimal performance based on the workload of the block storage volume. Thus, by basing the volume characteristics on the workload classification, consistent performance can be maintained among users and among block storage volumes. Consistent performance can be beneficial to users, as the user may otherwise encounter throttling when interacting with a particular block storage volume based on a changing workload of the user (e.g., while a block storage volume with a first set of volume characteristics may provide a satisfactory experience for a user with a first workload, based on the changing workload of the user, the block storage volume may no longer provide a satisfactory experience for a user with a second workload). Further, the use of a workload classification allows an optimal experience to be shared by multiple users implementing the same workload. For example, if the storage optimization system determines that, for a first user with a first workload, a block storage volume with a first set of volume characteristics provides the optimal experience, the storage optimization system can recommend the first set of volume characteristics for a second user with the first workload. Moreover, consistent performance across the block storage volume as the workload of the user changes can ensure that a user has a same or similar experience when interacting with the block storage volume. Thus, by classifying the workload of the block storage volume and dynamically modifying the block storage volume, embodiments of the present disclosure can provide a consistent and desirable end user experience.

In accordance with embodiments of the present disclosure, a storage optimization system can be implemented for dynamically modifying a block storage volume based on a workload classification of a user. The user may request a block storage volume with a first set of volume characteristics. A particular volume characteristic may correspond to how the block storage volume stores data. For example, a particular volume characteristic may indicate a volume type (e.g., a solid state drive, a hard disk drive) of the block storage volume. A particular volume characteristic may further correspond to the amount of data that the block storage volume can store. For example, a particular volume characteristic may indicate a volume size (e.g., megabytes ("MB"), gigabytes ("GB"), terabytes ("TB"), etc.) of the block storage volume. Further, a particular volume characteristic may correspond to how the VM instance interacts with the block storage volume. For example, a particular volume characteristic may indicate an average number of interactions between the VM instance and the block storage volume (e.g., average input/output operations per second ("IOPS"), average seek time, average raw read speed, average raw write speed, average request latency, a number of pending input/output operations). The first set of volume characteristics may correspond to a workload of the user. For example, the user may select the first set of volume characteristics based on the workload of the user. Therefore, a user may implement a block storage volume based on a first set of volume characteristics and transmit the first set of volume characteristics to the storage optimization system.

The storage optimization system may then obtain a workload and the volume characteristics for the block storage volume. Upon initialization of the block storage volume, or at any other time, the storage optimization system may receive volume characteristics associated with the block storage volume. The storage optimization system may store the volume characteristics in associated with an identifier for the block storage volume. In some embodiments, the storage optimization system may define a workload for the block storage volume based on usage metric values associated with the block storage volume. For example, the workload may be based on one or more of average IOPS, average seek time, average raw read speed, average raw write speed, or average request latency. The storage optimization may define the particular set of values (e.g., usage metric values or text-inputs provided by the user) as the workload associated with the block storage volume. Therefore, the storage optimization system obtains a workload and the volume characteristics associated with the block storage volume.

In order to determine a workload classification of the block storage volume, the storage optimization system further obtains a set of workload classifications. Each workload classification may correlate with a particular set of volume characteristics and a particular workload. The correlation of the set of volume characteristics and the workload indicates that a block storage volume configured according to the set of volume characteristics may provide an optimal performance for a block storage volume with the workload. The set of workload classifications may be personal to a particular user. For example, the set of workload classifications may be built or learned based solely on behavior of the user. In some embodiments, the set of workload classifications may be built or learned based on behavior of multiple users. The set of workload classifications may be built by determining a set of volume characteristics that are associated with a particular workload. For example, the set of volume characteristics may correspond to the most often implemented volume characteristics in association with a particular workload. Further, the set of volume characteristics may correspond to volume characteristics with a particular (e.g., highest) satisfaction rate for a particular workload. The set of workload classifications may be based on the recommendations that the storage optimization system. For example, if the storage optimization recommends a first set of volume characteristics for a first workload and the recommendation is not accepted, the storage optimization system may modify the set of workload classifications. Further, if the recommendation is accepted, the storage optimization system may also modify the set of workload classifications. The set of workload classifications may be generated by the storage optimization system or a different, distinct system. Therefore, the storage optimization system obtains a set of workload classifications.

Based on the obtained set of workload classifications and the workload for the block storage volume, the storage optimization system further classifies the workload as belonging to a specific workload classification. The storage optimization system can parse the workload to determine a set of workload values (e.g., usage metric values) that define the particular workload. The storage optimization system can further query the set of workload classifications to determine if a workload classification includes the set of workload values. Based on querying the set of workload classifications, the storage optimization system may determine a workload classification associated with the workload. The workload classification may include the workload and a second set of volume characteristics. In some embodiments, the set of workload classification may not include the set of workload values. The storage optimization system may add the workload and the associated volume characteristics as a new workload classification to the set of workload classifications. Therefore, the storage optimization system classifies the workload as belonging to a specific workload classification.

The storage optimization system may further compare the first set of volume characteristics from the block storage volume and the second set of volume characteristics from the obtained workload classification. The storage optimization system may determine, based on the comparison of the volume characteristics, a recommended configuration of volume characteristics for the block storage volume. For example, the recommended configuration of the block storage volume may indicate an optimal set of volume characteristics for the block storage volume based on the workload classification. The recommended configuration may include the current set of volume characteristics of the block storage volume or a new set of volume characteristics of the block storage volume. Based on the optimal set of volume characteristics, the storage optimization system may provide a recommendation to the user to accept the optimal set of volume characteristics as the new volume characteristics for the block storage volume. In some embodiments, the storage optimization system may automatically modify the volume characteristics of the block storage volume to correlate with the optimal set of volume characteristics. For example, the storage optimization system may proactively scale the block storage volume based on determining that the block storage volume ideally includes a greater volume size. In other embodiments, the storage optimization system may provide a block storage volume configured according to the ideal configuration and replace the existing block storage volume with the original set of volume characteristics with the new block storage volume with the optimal set of volume characteristics. In modifying the volume characteristics of the block storage volume to correlate with the optimal set of volume characteristics, the storage optimization system can modify the volume characteristics of the block storage volume to be a match of the optimal set of volume characteristics or modify the volume characteristics to be within a particular percentage (e.g., share a certain amount of similarities with) with at least a portion of the optimal set of volume characteristics.

Various aspects of the disclosure will now be described with regard to certain examples and embodiments, which are intended to illustrate but not limit the disclosure. Although aspects of the embodiments described in the disclosure will focus, for the purpose of illustration, on a particular type of storage system (e.g., a block storage volumes), one skilled in the art will appreciate that the techniques disclosed herein may be applied to any number of types of storage systems, computing devices, etc.

As will be appreciated by one of skill in the art in light of the present disclosure, the embodiments disclosed herein improve the ability of computing systems, such as cloud computing systems providing block storage volumes, to implement such volumes in a consistent manner independently of how the requirements or usage by a user change. Moreover, the presently disclosed embodiments address technical problems inherent within computing systems; specifically, the issues in the performance of a device configured according to first parameters with a workload that is better suited for second parameters. These technical problems are addressed by the various technical solutions described herein, including the obtaining of workload classifications and determining a workload classification for a particular workload, the determined workload classification is then used to identify parameters for the block storage volume. Thus, the present disclosure represents an improvement on computing systems providing block storage volumes and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 110 in which embodiments of the present disclosure can be implemented. the cloud provider network 110 can be accessed by user computing devices 102 over a network 104. A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 110 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 110 includes a compute service 120, a block storage service 130, and an optimization service 140 (also referred to as a storage optimization system 140) that are in networked communication with one another and with the network 104 to provide users with on-demand access to computing resources including VM instances 124 and block storage volumes 134, among others. These particular resources are described in further detail below. Some implementations of the cloud provider network 110 can additionally include domain name services ("DNS") services, object storage services, relational database services, and other service configurations (not illustrated) for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces ("GUIs"), command line interfaces ("CLIs"), application programming interfaces ("APIs")) enabling end users, via user computing devices 102, to access and configure resources provided by the various services. The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. Further, the cloud provider network may implement the optimization service 140 that recommends an optimal set of data storage services to a user based on data associated with the user. While the optimization service 140 is described herein with reference to data storage services, it may additionally or alternatively provide recommendations for any of the other services listed above. Specifically, as disclosed herein, the service 140 may reduce costs and improve performance by using machine learning to analyze historical utilization metrics of a service, reducing or eliminating wasteful over- or under-provisioning of resources for such services. The service 140 can assist end users in selecting, for example, preferred configurations of virtual machines and data storage volumes to implement a desired workload, by identifying workload patterns according to one or many defining characteristics, identifying hardware resource required to supported the workload pattern, and inferring how the workload pattern would have performed on various hardware platforms made available by the cloud provider network.

The cloud provider network 110 can provide on-demand, scalable computing platforms to users through the network 104, for example allowing users to have at their disposal scalable "virtual computing devices" via their use of the compute service 120 and block storage service 130. These virtual computing devices have attributes of a personal computing device including hardware (various types of processors, local memory, random access memory ("RAM"), and hard-disk and/or SSD storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 110 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center ("TC"). TCs are the primary backbone locations linking customers to the cloud provider network, and may be collocated at other network provider facilities (e.g., Internet service providers, telecommunications providers) and securely connected (e.g. via a virtual private network ("VPN") or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network 110 may deliver content from points of presence outside of, but networked with, these regions by way of edge locations and regional edge cache servers. This compartmentalization and geographic distribution of computing hardware enables the cloud provider network 110 to provide low-latency resource access to customers on a global scale with a high degree of fault tolerance and stability.

As illustrated in FIG. 1, the cloud provider network 110 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 110 via the network 104 to view or manage their data and computing resources, as well as to use websites and/or applications hosted by the cloud provider network 110.

Turning specifically to the roles of the different services within the cloud provider network 110, the compute service 120 include one or more host devices 122 to provide resizable computing capacity to users for building and hosting their software systems. The host devices 122 and associated control plane functionality can provide an elastic compute cloud service of the cloud provider network. Compute services can be referred to as a virtual compute service, or cloud compute service, in various implementations. Users can use the host devices 122 to launch as many VM instances 124 referred to as virtual computing environments, virtual compute instances, virtual machines, or "instances," as they need. While FIG. 1 depicts host devices 122 as including VM instances 124, in some instances the compute service 120 may enable an end user to directly access a host device 122 as a "bare metal" compute instance, providing access to the device 122 without virtualization.

The VM instances 124 can have various configurations of processing power, memory, storage, and networking capacity depending upon user needs. The host devices 122 can also include computer storage for temporary data used while an instance is running, however this storage may be limited. For example, the storage may be ephemeral, meaning that data stored in the storage is lost as soon as the instance is shut down this data is lost. To provide access to additional storage, each host device 122 can illustratively access the block storage service 130. As discussed below, the block storage service 130 can operate to provide virtualized storage drives to instances 124 in the form of block storage volumes 134. The compute service 120 may enable instances 124 to interact with such volumes 134, such as by accepting I/O requests from instances 124 according to a local mass storage protocol (e.g., SATA, SCSI, etc.) and converting such I/O requests to network communications with the block storage service 130.

As noted above, the block storage service 130 can provide persistent data storage for the instances 124 in the form of block storage volumes 134, each of which represents a virtualized, network-accessible block-storage device (e.g., a virtual "hard drive"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." Data of volumes 134 may be stored in the form of blocks on storage media 132, which may include any number of known non-volatile storage media, including magnetic disk drives, solid state memories, and the like. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation. In accordance with embodiments of the present disclosure, the specific hardware of storage media 132 can be heterogeneous, encompassing media of different types, manufacturers, revisions, production runs, and the like. Each volume 134 is illustratively hosted by one or more storage media 132.

Block storage volumes 134, which can be treated as an individual storage drive ranging for example from 1 GB to 1 terabyte TB (or more) in size, are made of one or more blocks stored on the block storage service 130. Although treated as an individual storage drive, it will be appreciated that a volume 134 may be stored as one or more virtualized devices implemented on one or more underlying storage media 132. Volumes 134 may be partitioned a small number of times (e.g., up to 16) with each partition stored on a distinct physical device of the cloud provider network 110 that has the ability to transfer data at around 1 GB per second ("Gbps") in some implementations. These volumes provided persistent, dedicated storage that can be attached to particular instances 124 of the compute service 120. Each volume 134 may be "attached" to an instance 124 running on a compute service 120, and can be detached from that instance 124 and re-attached to another. Further, an instance 124 running on the compute service 120 may be attached to a volume 134 and can be detached from that volume and re-attached to another. Additionally, an instance 124 may be attached to a volume 134 and the volume may be modified to meet the changing requirements of a user. The block storage service 130 may have built-in redundancy for volumes by replicating the volume across multiple storage media 132, such as different media 132 within an availability zone, which means that volumes will not fail if an individual drive fails or some other single failure occurs.

A block storage volume 134 can correspond to a set of volume "characteristics" based on the volume type (e.g., SSD, a high density disk ("HDD"), etc.). The volume characteristics may indicate various features of the block storage volume 134. The volume characteristics may include one or more of a volume type, a volume size, an average IOPS, an average seek time, an average raw read speed, an average raw write speed, an average request latency, a number of pending input/output operations, a random read speed, a random write speed, a sequential read speed, a max sustained IOPS, a max burst IOPS, one or more supported protocols, a durability, a performance consistency, etc. For example, the volume characteristics may indicate a durability (e.g., as an annual failure rate of 99.8%, 99.9%, 99.999% (also referred to as "five nines durability"), etc.), a performance consistency (e.g., as a probability of 90%, 95%, 99%, etc. that the performance will be within 10%, 15%, 20%, etc. of the provisioned performance), etc. The volume characteristics may indicate how the particular block storage volume 134 will operate when attached to a particular VM instance 124. For example, a block storage volume 134 with certain characteristics (e.g., a volume with 99% durability with a 90% performance consistency within 10% of the provisioned performance) may operate differently than a block storage volume 134 with different characteristics (e.g., a volume with 99.99% durability with an 80% performance consistency within 10% of the provisioned performance).

The differences in operation may further be based on the workload for the block storage volume 134. For example, a block storage volume 134 may achieve a greater performance for a first workload versus a second workload. The workload may indicate how a particular VM instance 124 interacts with or "uses" a potential block storage volume 134. Based on the workload and corresponding volume characteristics, the block storage volume 134 may perform a desired storage function.

As noted above, the performance of the block storage volumes 134 from the point of view of the VM instances 124 may vary according to various metrics associated with the block storage volume, including, for example, the volume characteristics of the block storage volume 134 and the workload indicating how the VM instance 124 is using the block storage volume 134. Therefore, a particular block storage volume 134 may be attached to a particular VM instance 124 based on the metrics associated with each. In order to ensure a consistent performance based on the workload, the storage optimization system 140 can be configured to receive the workload indicating the usage of a block storage volume 134 by a VM instance 124.

In light of the different workloads that are supported on behalf of users, the cloud provider network 110 may provide users with a selection of a variety of VM instance types optimized to support different workloads. Generally, each VM instance type may be allocated a different amount of computing resources, and/or different combination of computing resources, such that the VM instance types are optimized, or computationally biased, to support different workloads. As used herein, computing resources refers to physical resources available to support computation, such as processing power (e.g., as a general purpose or special purpose processor), memory (including non-persistent data storage, such as random access memory, and persistent data storage), and networking. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing under-utilization of computing resources by the service provider network. Further, each VM instance type may be associated with one or more of a utilization data of the VM instance 124, memory associated with the VM instance 124, the network type, an operating system associated with the VM instance 124, VM instance tags, network bandwidth, CPU consumption of the VM instance 124, GPU consumption of the VM instance 124, or any other VM instance parameters.

The storage optimization system 140 may map the workload of the VM instance 124 to at least one workload category in various ways based on the classification data 142. For instance, the workload may include one or more words that describe the resource-utilization data of the workload, such as "web server," "database," "compute heavy," and so forth. The storage optimization system 140 may generate a series of workload categories based on metadata associated with multiple workloads. In some examples, the storage optimization system 140 may cluster the workload into a workload category based on the metadata (e.g., user provided data, historical utilization data, etc.) of the workload using a clustering algorithm. Therefore, the workload classification may be based on multiple field values of the metadata of the workload. After the storage optimization system 140 maps the workload to one of the workload categories, the storage optimization system 140 may generate a recommendation for the block storage volume 134 for the VM instance 124.

The storage optimization system 140 may identify one or more additional workloads associated with the workload category, and may further determine types of block storage volumes 134 (e.g., a set of volume characteristics) that are associated with the one or more workloads. Based on the workload being associated with the workload category, the storage optimization system 140 can determine a recommended set of volume characteristics for the block storage volume 134 based on the sets of volume characteristics that are associated with the one or more additional workloads associated with the same workload category. By determining a recommended set of volume characteristics based on implemented sets of volume characteristics for workloads associated with the same workload category, the storage optimization system 140 can determine an informed recommendation based on already implemented sets of volume characteristics for other users. This enables the storage optimization system 140 to determine the recommended set of volume characteristics without relying on a trial-and-error method or relying solely on the input of the user implementing the block storage volume 134. For example, the storage optimization system 140 can determine the workload is associated with workload category X and, as other workloads associated with workload category X implement volume characteristics Y, can recommend volume characteristics Y for the workload. Further, the storage optimization system may determine that a majority of the one or more workloads are associated with a specific set of volume characteristics (e.g., a specific durability and performance consistency). Based on the identified set of volume characteristics, the storage optimization system 140 may generate a recommendation for the block storage volume 134.

Further, the storage optimization system 140 may generate one or more recommendations for the block storage volume 134, each recommendation including a type of block storage volume and an associated confidence, the confidence based on a number of types of block storage volumes associated with the workload category that implement the type of block storage volume. For example, 60% of block storage volumes associated with the workload category implement block storage volume type A, 30% of block storage volumes associated with the workload category implement block storage volume type B, and 10% of block storage volumes associated with the workload category implement block storage volume type C. Further, the confidence associated with block storage volume type A may be based on the 60% implementation rate, the confidence associated with block storage volume type B may be based on the 30% implementation rate, and the confidence associated with block storage volume type C may be based on the 10% implementation rate. In some implementations, the storage optimization system 140 may determine the confidence associated with each recommendation using Bayes rule. Further, the storage optimization system 140 may determine the confidence associated with each recommendation based on the overall number of block storage volumes associated with the type of block storage volume. For example, while 60% of block storage volumes associated with the workload category implement block storage volume type A, only 10% of all block storage volumes implement block storage volume type A and the confidence may be based on this overall implementation rate (e.g., 10%) and the workload category specific implementation rate (60%) using Bayes rule.

In determining the set of recommended volume characteristics, the storage optimization system 140 may identify a type of block storage volume most likely to meet the volume characteristics of the block storage volume 134 (e.g., durability and performance consistency needs of the user) and other types of block storage volumes that are less likely to meet the volume characteristics of the block storage volume 134. Depending on the size (e.g., amount of resources), and/or the combination of computing resources, for the workload, the storage optimization system 140 may provide a ranked listing of types of block storage volumes that are recommended for the workload based on the confidence associated with each. In some examples, the storage optimization system 140 may further provide suitability data that indicates how suitable the recommended a specific type of block storage volume may be for supporting the workload, such as indicating a number of stars out of five stars, percentages indicating how suitable out of one-hundred percent, and/or any other suitability score or indicator. Further, the storage optimization system 140 may provide a textual explanation regarding why the type of block storage volume is optimized to support the workload such that the user may make a more intelligent decision as to which of the block storage volume types they would like to launch their workload on. The storage optimization system 140 may directly modify the block storage volume 134 based on the generated recommendation for the user. In some embodiments, the storage optimization system 140 may provide the recommendation to the user and, based on a subsequent response from the user, may modify the block storage volume 134 or may maintain the block storage volume 134.

In some examples, the storage optimization system 140 may further monitor a workload for the life of the workload, and provide additional recommendations upon detecting particular events that result in a change to the recommendation. Further, the storage optimization system 140 may continually, or periodically, update a recommendation for a workload based on responses received for a particular recommendation. For example, based on receiving one or more rejections or one or more acceptances for a particular recommendation for the workload classification, the storage optimization system 140 may modify the recommendation and may provide an updated recommendation to the user.

Figure 2:
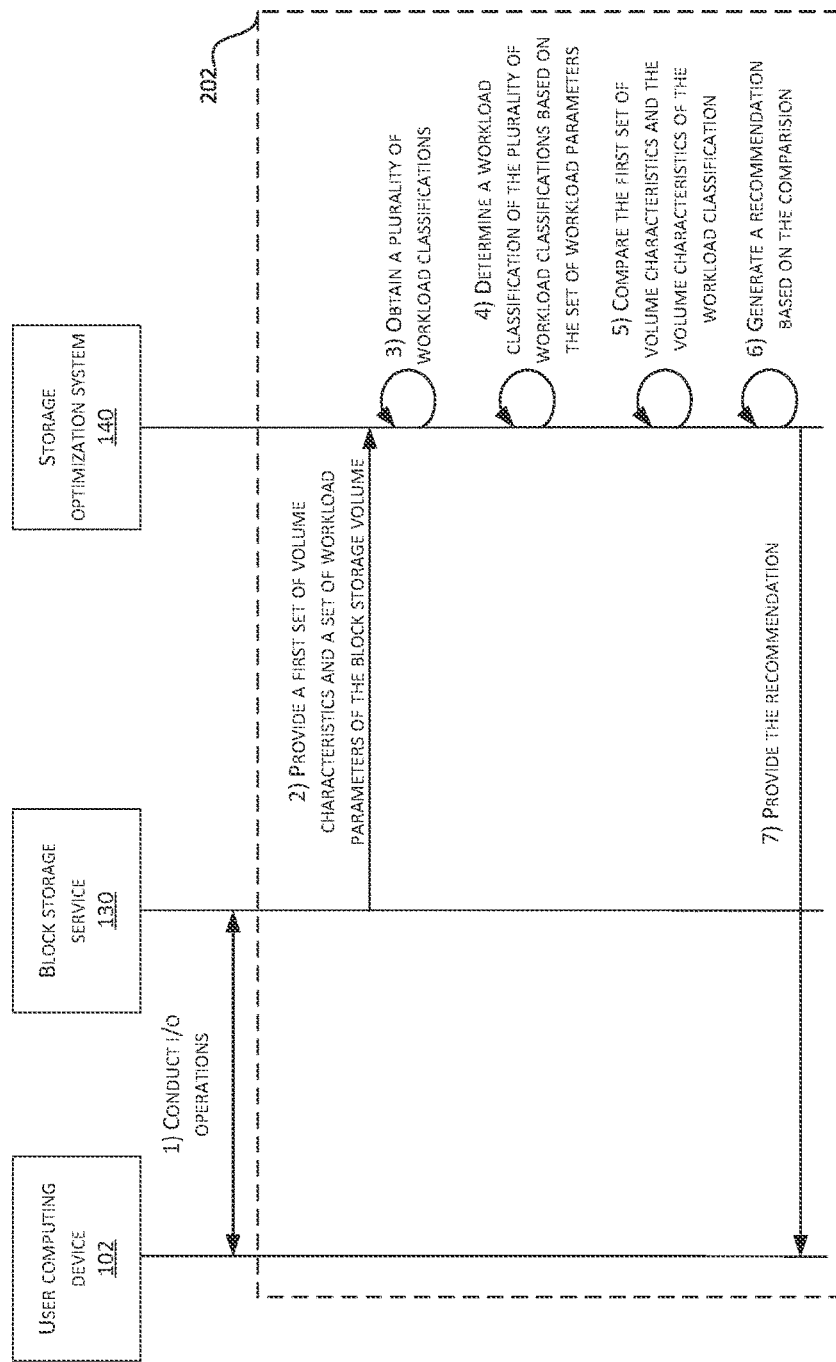
FIG. 2 depicts an example workflow for providing a recommended block storage volume according to some embodiments.

FIG. 2 depicts an example workflow 200 for according to some embodiments. With reference to FIG. 2, illustrative interactions will be described for classifying a workload and providing recommended volume characteristics for a block storage volume to implement the workload, in accordance with embodiments of the present disclosure. The interactions of FIG. 2 may occur, for example, after a block storage volume 134 has been attached to a VM instance 124. Further, the interactions of FIG. 2 may occur after a user has completed creation of the block storage volume 134 on the block storage service 130.

The interactions begin at (1), where the user computing device 102 conducts I/O operations (e.g., interactions) with the block storage service 130. The user computing device 102 can perform various I/O operations (e.g., read/write operations) with a particular block storage volume 134 from the block storage service 130. The user computing device 102 may perform the I/O operations through a VM instance 124 configured to read from and write to a block storage volume 134 with particular volume characteristics. For example, the block storage volume 134 may have a volume type, a volume size, average reads and/or writes per second, etc. In some embodiments, the block storage volume 134 may have a default set of volume characteristics. For example, the default set of volume characteristics may include a default volume size, a default volume type, etc. Further, the interactions may begin where the block storage volume 134 begins initialization. In some embodiments, the interactions may begin when a user requests a recommendation for a block storage volume.

To determine how the VM instance 124 has interacted with the initialized block storage volume 134, the block storage service 130, at (2), transmits a first set of volume characteristics and a set of workload parameters to the storage optimization system 140. Each volume characteristic may correspond to a configurable parameter associated with the initialized block storage volume. It will be understood that the first set of volume characteristics may include more, less, or different volume characteristics. The storage optimization system 140 may obtain a designation of the first set of volume characteristics from the user computing device 102 or the block storage service 130. In some embodiments, the storage optimization system 140 may determine the first set of volume characteristics by analyzing the block storage volume 134.

Further, the first set of volume characteristics may be a configuration of the block storage volume 134. For example, the first set of volume characteristics may indicate a particular volume configuration corresponding to a 50 GB SSD with 99.9999% durability and 0.1 ms latency. The configuration of the block storage volume 134 may correspond to a particular set of volume characteristics such as one or more of a volume type, a volume size, sustained IOPS, burst IOPS, average seek time, average raw read speed, average raw write speed, a number of pending input/output operations, or average request latency. Further, the configuration may correspond to additional parameters such as cost, user preference, etc. In some embodiments, the block storage service 130 may select the first set of volume characteristics by determining a configuration that meets general parameters (e.g., a general configuration that satisfies a worst case workload or particular workloads). For example, the first set of volume characteristics may be selected by choosing a configuration that satisfies certain extreme workloads. Further, the block storage service 130 may select the first set of volume characteristics based on previous workloads associated with the user or a collection of users (e.g., by determining a most compute intensive previous workload associated with the user).

In some embodiments, the storage optimization system 140 may obtain the first set of volume characteristics prior to the block storage service 130 generating a block storage volume 134 with the first set of volume characteristics for the user. For example, the block storage service 130 can receive an indication that the user has requested to implement a block storage volume 134 with a first set of volume characteristics that will be used for a workload (e.g., the set of workload parameters). Prior to implementing the block storage volume 134 with the first set of volume characteristics, the block storage service 130 may transmit the first set of volume characteristics and the workload parameters to the storage optimization system 140. By receiving the first set of volume characteristics prior to the instantiation of the block storage volume 134, the storage optimization system 140 can determine if the workload parameters are optimized for the first set of volume characteristics and/or determine an optimal set of workload parameters.

In order to determine if the first set of volume characteristics are optimized for a particular workload, the storage optimization system 140 can obtain a set of workload parameters indicating a current or proposed workload for a block storage volume 134. The storage optimization system 140 can obtain the set of workload parameters from one or more of the user computing devices 102, the block storage volume 134, the block storage service 130, or any other component of the example computing environment 100. The set of workload parameters may be a set of observable parameters that are observed by one or more of the user computing devices 102, the block storage volume 134, the block storage service 130, or any other component of the example computing environment 100. In some embodiments, a user can define the workload by providing a set of workload parameters associated with the workload. For example, the storage optimization system 140 and/or the block storage service 130 may receive the workload parameters from the user as a packet of data.

The storage optimization system 140 and/or the block storage service 130 may provide the user, via the user computing devices 102, access to one or more user interfaces configured to receive input data describing the workload. For example, a web console wizard may present one or more graphical user interfaces ("GUIs") that enable a user to input data that defines a workload using language or input mechanisms that come natural to the user. The storage optimization system 140 may subsequently receive the workload parameters from the user and/or the block storage service 130. In some examples, the GUI may provide information to assist the user in selecting volume characteristics of an optimized block storage volume 134 for a new workload. The GUI may provide the users with enough information for them to make a decision regarding the volume characteristics to select a particular volume configuration for a particular set of workload parameters.

The GUI may provide various fields for which the user can select particular field values (e.g., workload parameters) in order to define the workload. For example, the GUI can provide a name field through which the user can provide a name of the workload, or other unique identifier for the workload. For example, the name field can indicate the name of the workload is "Workload #1." The GUI may further a description field for which the user can provide a brief description of the workload and its intended purpose. The GUI may further include a workload-type field, which may include various predefined field values such as "Web Server," "Online Gaming," "IT," "Database," "Customer Facing Application," etc. and/or may allow the user to provide a custom workload-type. The GUI may further an environment field, which may include various predefined field values such as "production," "pre-production," etc. and/or may allow the user to provide a custom workload environment. The GUI may include further fields such as a visitors expected per day field, an acceptable load time for a webpage field, a network bandwidth field, a storage field, a latency field, etc. in order to define the workload. Based on the field values obtained for the fields, the GUI may generate and/or determine workload parameters that define the workload and provide the workload parameters to one or more the storage optimization service 140 and/or the block storage service 130. Additionally, any type of input mechanism may be used to receive input data (e.g., workload parameters) that can define a workload in addition to text-input fields or drop-down selections.

In some embodiments, the block storage service 130 may determine workload parameters by analyzing and/or determining how the VM instance 124 has used or interacted with the block storage volume 134 for a particular time period and transmitting the workload parameters to the storage optimization system 140. Further, the workload parameters may be determined by analyzing usage metrics and associated usage metric values. For example, a particular usage metric value may indicate how the VM instance 124 has used the block storage volume 134 during a previous one hour period. Further, the usage metric values may be a recording of I/O patterns for a particular period of time between the VM instance 124 and the block storage volume 134. It will be understood that the usage metric may track the usage of the block storage volume 134 over any time period. For example, a usage metric value may indicate usage of the block storage volume 134 over a second, a minute, an hour, a day, etc. Further, the block storage service 130 may periodically transmit usage metric values to the storage optimization system 140. For example, the block storage service 130 may periodically determine (e.g., every minute, hour, day, etc.) the usage metric values. Further, the block storage service 130 transmits usage metric values for multiple usage metrics to the storage optimization system 140. Further, the block storage service 130 may transmit a collection of usage metric values for related usage metrics to the storage optimization system 140. For example, the block storage service 130 may transmit usage metric values determined over the previous hour to the storage optimization system 140. Further, where the block storage service 130 determines a usage metric value each minute, the block storage service may transmit 60 usage metric values to the storage optimization system 140 at the end of the hour. Therefore, the storage optimization system 140 may periodically update the workload parameters and, periodically, update the workload.

In order to periodically determine the usage metric values, the block storage service 130 may monitor the interactions between the block storage volume 134 and the VM instance 124. Specifically, the block storage service 130 may monitor how the block storage volume 134 performs when attached to the VM instance 124. The usage metric may be a measure of how quickly the block storage volume 134 can execute commands (e.g., read and/or write commands). For example, the usage metric may be a measure of burst IOPS, sustained IOPS, raw read speed, raw write speed, etc. The burst IOPS may be a measure of IOPS for a first period of time (a "burst") and the sustained IOPS may be a measure of IOPS for a second longer period of time. Further, the usage metric may be a measure of how quickly the block storage volume 134 can locate data. For example, the usage metric may be a measure of average seek time. Further, the usage metric may be a measure of latency (e.g., request latency) or a measure of the distance between blocks (of the block storage volume) read. For example, by measuring the distance between blocks read, the usage metric values can allow for latency to be simulated between an SSD and a HDD. Further, the usage metric may be a measure of a number of input/output operations that are pending execution by the block storage volume 134. For example, the usage metric may be a measure of a number of pending input/output operations. In some embodiments, the block storage system 130 can transmit multiple usage metric values to the storage optimization system 140. For example, the block storage service 130 can transmit multiple usage metric values corresponding to multiple time periods and/or multiple usage metric values corresponding to multiple different usage metrics (e.g., a measure of latency, sustained IOPS, and raw read speed. By obtaining the usage metric values, the storage optimization system can determine how the VM instance 124 and the block storage volume 134 are interacting. Therefore, the block storage service 130 transmits the usage metric values to the storage optimization system 140 in order to define the workload.

In order to determine a workload classification for the set of workload parameters associated with the block storage volume 134, the storage optimization system 140, at (3), obtains a plurality of workload classifications. The storage optimization system 140 may obtain the plurality of workload classifications from a workload classification system (e.g., a clustering component). The plurality of workload classifications described herein may be any type of workload classifications and may be obtained in any manner, such as those described, for example, in U.S. patent application Ser. No. 16/367,768, filed Mar. 28, 2019, and entitled CLASSIFICATION OF WORKLOADS IN A DISTRIBUTED COMPUTING ENVIRONMENT, the entire disclosure of which is hereby incorporated by reference herein for all purposes. These are just some examples of the types of workload classifications and methods for obtaining the workload classifications. Other suitable types of workload classifications and methods for obtaining the workload classifications may be used. In some embodiments, the cloud provider network 110 may include the clustering component. The plurality of workload classifications may include a plurality of sets of workload parameters and a plurality of sets of volume characteristics. Each particular set of workload parameters may correspond to a particular workload that is associated with multiple users. Each user may implement a block storage volume with a particular set of volume characteristics for the workload. Therefore, each workload may be associated with multiple sets of volume characteristics. The multiple sets of volume characteristics may include each set of volume characteristics associated with a particular workload. Further, the workload classification may contain further identification information indicating the number of users for a particular workload that are associated with each set of volume characteristics. For example, the workload classification may indicate a number of users that are associated with each set of volume characteristics. Further, the workload classification may rank the sets of volume characteristics based on the number of users that are associated with each particular set of volume characteristics.

In some embodiments, the storage optimization system 140 may include the clustering component to generate the plurality of workload classifications. The clustering component may cluster (e.g., classify) workloads based on historical-utilization data (e.g., observed workload parameters)

and/or user-specified workload parameters. More specifically, the clustering component may analyze the historical-utilization data and/or the user-specified workload parameters using one or more clustering/classification algorithms or techniques to cluster the different types of workloads into workload classifications based on similarities between the historical-utilization data and/or the user-specified workload parameters for the different workloads.

The clustering component may generate or determine the workload classifications using various clustering techniques. The various clustering techniques can define a range of workload parameters that include the set of workload parameters. For example, the clustering techniques can define a range of IOPS (e.g., 1 IOPS to 10 IOPS) and the set of workload parameters may include an IOPS workload parameter within that range (e.g., 5 IOPS). The clustering techniques performed by the clustering component may be unsupervised clustering techniques, supervised clustering techniques, partially supervised clustering techniques, and/or any combination thereof. For example, the clustering component may cluster in time series where individual time series of the historical-utilization data and/or the user-specified workload parameters is grouped based on similar time series into a same cluster. As a specific example, game-hosting servers may scale more during the day, or certain hours of the day, such as evenings when players are no longer working. More broadly, workloads that have spikes and lulls in particular types of computing resources (e.g., CPU, memory, disk, network bandwidth, GPU, etc.) may be clustered into the same workload classifications. The clustering component may determine a number of clusters (e.g., based on the number of workload types), and utilize a clustering method, such as k-means clustering, to cluster types of the workloads into the workload classifications until a sufficient amount of the workloads have been assigned to a workload classification such that the workload classifications are substantially representative of the different types of workloads supported by the cloud provider network 110. Further, the clustering component may then assign names to the workload classifications based on, for example, tagging data associated with the workload. Further, the workload classifications may be assigned names based on the historical-utilization data and/or the user-specified workload parameters for the represented workloads. Therefore, the clustering component may create, generate, or otherwise define workload classifications that are representative of different types of workloads.

As noted above, the storage optimization system 140 obtains a plurality of workload classifications. In order to determine a workload classification associated with the set of workload parameters, the storage optimization system 140, at (4), determines a workload classification of the plurality of workload classifications based on the set of workload parameters. Each workload classification of the plurality of workload classifications can be associated with a particular set of workload parameters and one or more sets of volume characteristics. Further, each workload classification can be associated with a particular cluster in multivariate space where each variable of the multivariate space corresponds to a particular workload parameter. Each cluster in multivariate space may correspond to a group of workload parameters or a group of workload parameter ranges. In order to determine the workload classification associated with the set of workload parameters, the storage optimization system 140 can identify a multivariate point in the multivariate space based on each workload parameter of the set of workload parameters. Further, the storage optimization system 140 can identify a particular cluster in multivariate space that corresponds to (e.g., contains) the multivariate point. Based on identifying the cluster in multivariate space that corresponds to the multivariate point, the storage optimization system 140 can identify a workload classification associated with the set of workload parameters. In some embodiments, the storage optimization system 140 may determine that the multivariate point does not correspond to a particular multivariate cluster and the storage optimization system 140 may determine a closest (e.g., most likely) cluster corresponding to the set of workload parameters and/or generate a new cluster.

Further, the storage optimization system 140 can compare the set of workload parameters associated with the block storage volume 134 with the various sets of workload parameters from the plurality of workload classifications to determine a workload classification that matches the set of workload parameters. The storage optimization system 140 can determine if each workload parameter of the set of workload parameters matches the workload parameters of any set of workload parameters from the workload classifications. In some embodiments, the storage optimization system 140 can determine if a particular percentage, number, etc. of workload parameters from the set of workload parameters match the workload parameters of any set of workload parameters from the workload classifications. In other embodiments, the storage optimization system 140 can determine if a particular workload parameter from the set of workload parameters shares at least a certain level of similarity (e.g., 70%, 80%, 90%, etc.) with a corresponding workload parameter of a particular workload classification. Further, the user may provide the particular level of similarity between the sets of workload parameters to be deemed a match. In the event that the storage optimization system 140 determines that the set of workload parameters do not match the workload parameters of any set of workload parameters from the workload classifications, the storage optimization system 140 may generate a new workload classification corresponding to the set of workload parameters. Therefore, the storage optimization system 140 can determine a workload classification for the set of workload parameters associated with the block storage volume 134.

In order to determine a recommended set of volume characteristics for the block storage volume 134 based on the workload associated with the block storage volume 134, at (5), the storage optimization system 140 compares the first set of volume characteristics and the volume characteristics of the workload classification. By comparing the first set of volume characteristics and the volume characteristics of the workload classification, the storage optimization system 140 compares the volume characteristics implemented by the user with volume characteristics implemented by one or more users for the same or similar workload. The storage optimization system 140 compares sets of volume characteristics of block storage volumes located in the same logical cluster (e.g., workload). Further, by comparing the first set of volume characteristics and the volume characteristics of the workload classification, the storage optimization system 140 can rely on determinations of prior volume characteristics for different block storage volumes grouped in the same logical cluster in order to determine recommended volume characteristics for the block storage volume 134. The storage optimization system 140 can compare the first set of volume characteristics and the volume characteristics of the workload classification in order to determine if the current volume characteristics of the block storage volume 134 match the volume characteristics of the workload classification. The storage optimization system 140 can determine if each volume characteristic of the first set of volume characteristics matches the volume characteristics of the workload classification. Further, the storage optimization system 140 may compare the first set of volume characteristics with multiple sets of volume characteristics corresponding to the workload classification. The multiple sets of volume characteristics may correspond to multiple configurations implemented for block storage volumes associated with the workload. For example, 50% of volumes associated with the workload may correspond to a second set of volume characteristics and 40% of volumes associated with the workload may correspond to a third set of volume characteristics. Further, the storage optimization system 140 may compare the first set of volume characteristics with the second set of volume characteristics corresponding to a first volume configuration associated with the workload classification and with the third set of volume characteristics corresponding to a second volume configuration associated with the workload classification. Therefore, the storage optimization system 140 may determine if the first set of volume characteristics matches volume characteristics associated with the workload classification.

In some embodiments, the storage optimization system 140 can determine if a particular percentage, number, etc. of volume characteristics from the first set of volume characteristics match the volume characteristics of the workload classification. For example, if the first set of volume characteristics includes six volume characteristics (e.g., workload type, workload environment, latency, IOPS, volume type, volume size), the storage optimization system 140 may determine if at least a particular number (e.g., four) of the six volume characteristics match the volume characteristics of the workload classification. Further, the user may provide the particular number of volume characteristics that should match between the sets of volume characteristics to be deemed a match. In other embodiments, the storage optimization system 140 can determine if a particular volume characteristic from the first set of volume characteristics shares at least a certain level of similarity (e.g., 70%, 80%, 90%, etc.) with a corresponding volume characteristic of the workload classification. For example, if a particular volume characteristic is volume size, the storage optimization system 140 can determine whether the volume size of the first set of volume characteristics is within 75% of the volume size of the workload classification. Further, where the volume size of the first set of volume characteristics is 7.5 GB and the volume size of the workload classification is 10 GB, the volume sizes may be considered to match. Additionally, where the volume size of the first set of volume characteristics is 5 GB and the volume size of the workload classification is 10 GB, the volume sizes may not be considered to match. Further, the user may provide the particular level of similarity between the sets of volume characteristics to be deemed a match.

Further, the storage optimization system 140 may further compare the sets of volume characteristics based on one or more user parameters (e.g., cost, user preference, durability, etc.). For example, the storage optimization system 140 may compare the volume characteristics to generate a recommendation and determine that the current volume characteristics do not match the volume characteristics of the workload classification, yet recommend not modifying the volume characteristics based on determining that the volume characteristics of the workload classification costs more than the current volume characteristics. Based on comparing the volume characteristics, the storage optimization system 140 may determine a recommended set of volume characteristics.

As noted above, the storage optimization system 140 compares the first set of volume characteristics and the volume characteristics associated with the workload classification. Based on this comparison, the storage optimization system 140, at (6), generates a recommendation for the block storage volume 134. The storage optimization system 140 may further generate a set of recommended configurations based on comparing the first set of volume characteristics with multiple sets of volume characteristics. For example, the set of configurations may be a ranking of the configurations from highest recommendation (e.g., a configuration that a majority of users implementing the block storage volume have implemented) to lowest recommendation (e.g., a configuration that the least number of users implementing the block storage volume have implemented).

Further, each configuration may be associated with a number or percentage of users that have implemented a block storage volume with a particular set of volume characteristics and associated with the workload. The storage optimization system 140 may further determine and/or obtain (e.g., from the user or from the block storage service 130) a threshold (e.g., a number or percentage) of users associated with a workload that implement a particular set of volume characteristics in order to generate a recommendation. For example, the storage optimization system 140 may generate a recommendation for a particular set of volume characteristics if at least 60% of users associated with the workload have implemented a block storage volume with the particular set of volume characteristics. If the number or percentage of users associated with a particular set of volume characteristics is below a threshold, the storage optimization system 140 may not generate a recommendation or may generate a light recommendation. Further, the storage optimization system 140 may obtain a plurality of thresholds. For example, a first threshold may correspond to a best recommendation, a second threshold may correspond to a medium recommendation, a third threshold may correspond to a lowest recommendation, etc. For example, the thresholds may be personal to a user or may be based on users associated with block storage volumes sharing certain volume characteristics (e.g., users associated with certain premium devices may have a higher threshold than other users not associated with the premium devices). Further, the storage optimization system 140 may further determine and/or obtain a confidence threshold. The confidence threshold may identify a number and/or percentage of users associated with a workload that implement a set of volume characteristics that are different from the first set of volume characteristics in order to generate a recommendation. For example, the storage optimization system 140 may generate a recommendation to modify the first set of volume characteristics if at least 70% of users associated with the workload have implemented a block storage volume with a set of volume characteristics different from the first set of volume characteristics. Further, the storage optimization system 140 may contain a feedback loop such that a user's decision to accept a particular configuration implemented by a certain number of other users, may decrease a user's threshold if the number of users is below the threshold. On the other hand, a user's decision to reject a particular configuration implemented by a certain number of other users may cause the storage optimization system 140 to increase the user's threshold if the number of users is above the threshold. Therefore, the storage optimization system 140 may generate a recommendation for a block storage volume.

As noted above, the storage optimization system 140 compares the first set of volume characteristics and the volume characteristics of the workload classification in order to generate a recommendation for the block storage volume. Based on generating the recommendation, the storage optimization system 140, at (7), provides the recommendation (e.g., a recommended configuration) for the block storage volume 134 to the user computing device 102. The storage optimization system 140 may provide the recommendation by providing an indicator of the recommended configuration. For example, the indicator may identify the volume characteristics that are related to the recommended configuration. In some embodiments, the storage optimization system 140 may obtain a response from the user computing device 102 indicating that the user has accepted, rejected, flagged, tagged, stored, or otherwise responded to the recommended configuration. Based on obtaining the response, the storage optimization system 140 may modify the block storage volume 134 to match the recommended configuration if accepted or provide a new recommended configuration if the recommended configuration was rejected. Based on the response of the user, the storage optimization system 140 may further modify the workload classifications of the user and/or the workload classifications of a group of users. For example, the storage optimization system 140 may increase a correlation between the volume characteristics and the workload if the user accepts the recommendation or decrease a correlation between the volume characteristics and the workload if the user rejects the recommendation. Further, based on the response of the user, the storage optimization system 140 may further modify the confidence threshold that indicates a threshold for a user and/or group of users to meet in order to provide a recommendation. For example, a user's decision to reject a particular configuration and maintain the first set of volume characteristics, may increase the user's confidence threshold of users required in order to generate a recommendation. On the other hand, a user's decision to accept a particular configuration different from the first set of volume characteristics, may decrease the user's confidence threshold of users required in order to generate a recommendation. In one embodiment, recommended configurations are sent iteratively based on the response of the user and/or a particular time period, as shown by loop 202.

In other embodiments, based on generating the recommendation, the storage optimization system 140 may not provide the recommendation to the user computing device 102. Further, the storage optimization system 140 may proactively modify the block storage volume 134 based on the recommendation to match the recommended configuration. In order to modify the block storage volume 134, the storage optimization system 140 may modify the volume characteristics of the block storage volume 134 attached to the VM instance 124. In some embodiments, in order to modify the block storage volume 134, the storage optimization system 140 may generate or create a second block storage volume that matches the recommended configuration. Further, the storage optimization system 140 may modify the volume characteristics of the second block storage volume to match the recommended configuration. The storage optimization system 140 may detach the block storage volume 134 from the VM instance 124 and attach the second block storage volume. Therefore, the storage optimization system 140 provides the recommended configuration for the block storage volume 134.

FIG. 3 depicts an illustrative visualization of a set of workload classifications 300 for a block storage volume acting as a virtualized disk drive to a virtual machine instance on the cloud provider network of FIG. 1, which may be used to provide consistent performance when accessing the block storage volume. As discussed above, the storage optimization system may obtain the set of workload classifications 300 in order to determine a workload classification for a particular workload. Further, the storage optimization system may build, generate, or otherwise obtain the set of workload classifications 300.

The set of workload classifications 300 may include a plurality of workload classifications generated by a clustering component and defining various workloads for a user or a group of users. Each workload classification of the set of workload classifications 300 may include a set of workload parameters and an associated set of volume characteristics. Further, each workload classification of the set of workload classifications 300 may include a plurality of associated sets of volume characteristics. For example, a first set of volume characteristics for a particular workload classification may indicate a most common set of volume characteristics for a particular workload and further sets of volume characteristics for the workload classifications may indicate less common sets of volume characteristics for the workload.

In the example of FIG. 3, the set of workload classifications 300 includes workload classifications 1-5. It will be understood that the set of workload classifications may include more, less, or different workload classifications. Further, each workload classification of the set of workload classifications 300 is associated with a set of workload parameters. In the example of FIG. 3, the workload parameters are "workload type" and "environment." It will be understood that each workload classification may be associated with more, less, or different workload parameters. In the example of FIG. 3, workload classification 1 is associated with workload type "Web Server" and environment "Production," workload classification 2 is associated with workload type "Database" and environment "Production," workload classification 3 is associated with workload type "Customer Facing Application" and environment "Production," workload classification 4 is associated with workload type "Online Gaming" and environment "Pre-Production," workload classification 5 is associated with workload type "Machine Learning" and environment "Pre-Production."

Further, each workload classification of the set of workload classifications 300 is associated with one or more sets of volume characteristics. For example, workload classification 1 is associated with sets 1, 2, and 3 of volume characteristics, workload classification 2 is associated with sets 1 and 2 of volume characteristics, workload classification 3 is associated with set 1 of volume characteristics, workload classification 4 is associated with sets 1 and 2 of volume characteristics, workload classification 5 is associated with set 1 of volume characteristics. It will be understood that each workload classification may include more, less, or different sets of volume characteristics. Further, each set of volume characteristics may be associated with a number or percentage of users implementing the particular set of volume characteristics for the particular workload. In the example of FIG. 3, for workload classification 1, set 1 of volume characteristics is implemented by 25% of users, set 2 of volume characteristics is implemented by 24% users, and set 3 of volume characteristics is implemented by 23.8% users. Further, for workload classification 2, set 1 of volume characteristics is implemented by 51% of users and set 2 of volume characteristics is implemented by 49% of users. Further, for workload classification 3, set 1 of volume characteristics is implemented by 100% of users. Further, for workload classification 4, set 1 of volume characteristics is implemented by 33% of users and set 2 of volume characteristics is implemented by 33% of users. Further, for workload classification 5, set 1 of volume characteristics is implemented by 40% of users.

Further, in the example of FIG. 3, each set of volume characteristics includes field values for volume characteristics fields. In the example of FIG. 3, the volume characteristics fields are "Users," "Latency," "IOPS," and "Durability." It will be understood that each set of volume characteristics may include field values for more, less, or different volume characteristics fields. Further, in the example of FIG. 3, classification 1 includes set 1 of volume characteristics that includes "25-50" for "Users," "10 ms" for "Latency," "8.6" for "IOPS," and "99.997%" for "Durability," set 2 of volume characteristics that includes "N/A" for "Users," "0.1 ms" for "Latency," "0.9" for "IOPS," and "99.99%" for "Durability," and set 3 of volume characteristics that includes ">500" for "Users," "2.5 ms" for "Latency," "10.1" for "IOPS," and "99.999%" for "Durability." Further, classification 2 includes set 1 of volume characteristics that includes "100" for "Users," "0 ms" for "Latency," "6.5" for "IOPS," and "99.9999%" for "Durability," and set 2 of volume characteristics that includes "250" for "Users," "0.001 ms" for "Latency," "4.5" for "IOPS," and "99.993%" for "Durability." Further, classification 3 includes set 1 of volume characteristics that includes "10-15" for "Users," "20 ms" for "Latency," "9.1" for "IOPS," and "99.9199%" for "Durability." Further, classification 4 includes set 1 of volume characteristics that includes "<100" for "Users," "4 ms" for "Latency," "4.3" for "IOPS," and "$^{99}$0.9%" for "Durability," and set 2 of volume characteristics that includes "5-100" for "Users," "25 ms" for "Latency," "7.8" for "IOPS," and "99.95%" for "Durability." Further, classification 5 includes set 1 of volume characteristics that includes ">100" for "Users," "2 ms" for "Latency," "2.1" for "IOPS," and "99.99%" for "Durability."

Figure 4:
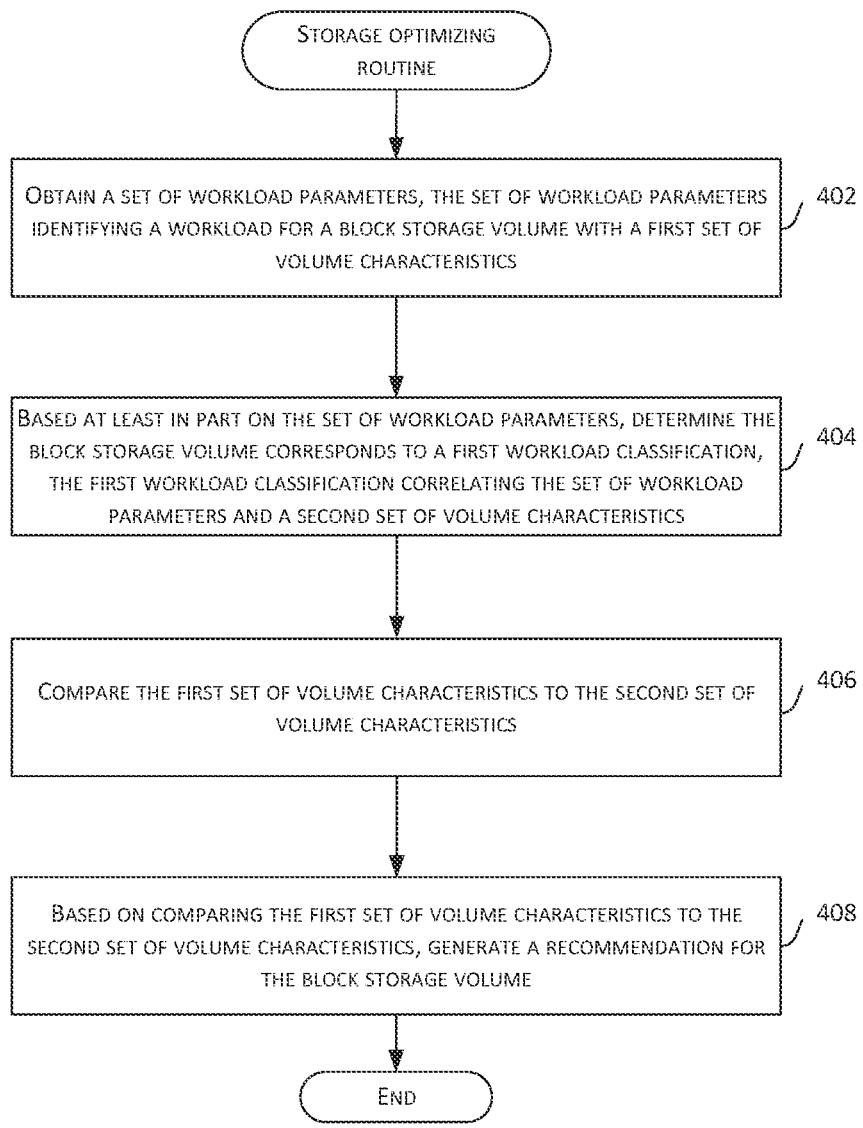
FIG. 4 is a flowchart of an example routine for modifying block storage volumes based on workload classifications

With reference to FIG. 4, an illustrative routine 400 will be described for optimizing a configuration of a block storage volume. The routine 400 may be implemented, for example, by the storage optimization system 140 of FIG. 1.

The routine 400 begins at block 402, a storage optimization system in communication with a block storage service obtains a set of workload parameters, the set of workload parameters identifying a workload for a block storage volume with a first set of volume characteristics. The first set of volume characteristics may be current volume characteristics associated with the block storage volume. For example, the first set of volume characteristics may include a current performance consistency and a current durability associated with the block storage volume. The set of workload parameters may be user-defined values. For example, the set of workload parameters may be a user provided definition of the workload associated with the block storage volume. In some embodiments, the workload parameters may be observable parameters indicating how a VM instance has used or interacted with the block storage volume over a previous time period. In some embodiments, the storage optimization system may obtain, periodically or otherwise, workload parameters from the block storage volume. The workload parameters may be a measure of one or more of a workload type, a workload environment, a number of users, a volume configuration, a volume size, throughput, a tag, an input/output operations per second, a seek time, a raw read speed, a raw write speed, a number of pending input/output operations, or a request latency. Therefore, the storage optimization system obtains a set of workload parameters.

Based at least in part on the set of workload parameters, at block 404, the storage optimization system determines the block storage volume corresponds to a first workload classification, the first workload classification correlating the set of workload parameters and a second set of volume characteristics. The storage optimization system may determine that the block storage volume corresponds to a first workload classification by comparing the workload parameters associated with the block storage volume to a plurality of workload classifications. The plurality of workload classifications may be specific to a user, specific to a group of users, or general. Each of the plurality of workload classifications may include a set of workload parameters and a corresponding set of volume characteristics. For example, each workload classification may include a set of workload parameters, a particular performance consistency, and a particular durability. Further, each workload classification of the plurality of workload classifications is associated with a particular weight. The weight weighting a correlation between a particular set of workload parameters and a particular set of volume characteristics. For example, the weight may be a percentage of users associated with the workload implanting a block storage volume with the particular set of volume characteristics. In some embodiments, in order to obtain the plurality of workload classifications, the storage optimization system may build the plurality of workload classification using training data. The training data may correspond to a plurality of block storage volume and indicate whether a particular recommendation is accepted or rejected for a particular block storage volume. In order to determine the block storage volume corresponds to a first workload classification, the storage optimization system may compare the set of workload parameters associated with the block storage volume to multiple sets of workload parameters from the workload classifications. Further, the storage optimization system may determine that the set of workload parameters associated with the block storage volume and the set of workload parameters associated with the first workload classification share a desired level of similarity (e.g., are within a desired range, are an exact match, etc.). Therefore, the storage optimization system determines the block storage volume corresponds to a first workload classification As noted above, the storage optimization system determines a first workload classification for the block storage volume. In order to determine a recommended configuration, the storage optimization system, at block 406, compares the first set of volume characteristics to the second set of volume characteristics. Further, the storage optimization system may compare the first set of volume characteristics with a plurality of sets of volume characteristics associated with the first workload classification. Each of the sets of volume characteristics may correspond to a volume configuration associated with the workload. Further, each set of volume characteristics may correspond to a percentage or number of users associated with the workload. For example, the first set of volume characteristics may correspond to a volume configuration implemented by a majority of the users associated with the workload and a second set of volume characteristics may correspond to a volume configuration implemented by a minority of the users associated with the workload. Therefore, the storage optimization system compares the first set of volume characteristics to the second set of volume characteristics.

As noted above, the storage optimization system compares the first set of volume characteristics to the second set of volume characteristics. In order to provide a recommended block storage volume for the user, the storage optimization system, at block 408, based on comparing the first set of volume characteristics to the second set of volume characteristics, generates a recommendation for the block storage volume. The storage optimization system may generate the recommendation by determining a set of volume characteristics associated with the workload classification. Further, the recommendation may include a set of volume characteristics implemented by a majority of users associated with the workload. In some embodiments, the recommendation may include a set of volume characteristics implemented by a threshold number or percentage (e.g., 30%) of users associated with the workload. In other embodiments, the recommendation may include a set of volume characteristics implemented by a greatest number of users associated with the workload. For example, if 10 users are associated with a workload and 4 users are associated with a first set of volume characteristics, 3 users are associated with a second set of volume characteristics, and 3 users are associated with a third set of volume characteristics, the recommendation may include the first set of volume characteristics. Therefore, the storage optimization system generates a recommendation for the block storage volume.

Based on generating the recommendation for the block storage volume, the storage optimization system can transmit the recommendation to a user. In some embodiments, the storage optimization system may provide a recommendation to modify the block storage volume to the selected set of volume characteristics to a user associated with the block storage volume. For example, the recommendation may include recommending to modify the block storage volume according to the second set of volume characteristics or recommending to maintain the block storage volume according to the first set of volume characteristics. The storage optimization system may further determine that the user has accepted or rejected the recommendation. Based on determining the user rejected the recommendation, the storage optimization system may decrease a weight (e.g., correlation) between the set of workload parameters and the selected set of volume characteristics. Further, based on determining the user rejected the recommendation, the storage optimization system may determine a third set of volume characteristics for the workload classification, the third set of volume characteristics and the second set of volume characteristics including different volume characteristics. The storage optimization system may generate a second recommendation for the user to modify the block storage volume based on the third set of volume characteristics and transmit the second recommendation to the user. Based on determining the user accepted the recommendation, the storage optimization system may increase a weight (e.g., correlation) between the set of workload parameters and the selected set of volume characteristics.

In other embodiments, the storage optimization system may directly modify a block storage volume to match the selected potential configuration. For example, the storage optimization system may modify the block storage volume attached to the VM instance to match the selected potential configuration. Further, the storage optimization system may modify a second block storage volume to match the selected potential configuration, detach the original block storage volume from the VM instance, and attach the second block storage volume to the VM instance. In some embodiments, modifying the block storage volume to match the selected potential configuration may include one or more of replicating the block storage volume, removing a first replica of the block storage volume, or transferring one or more replicas of the block storage volume from a first set of availability zones to a second set of availability zones. The storage optimization system may periodically generate a recommended configuration based on an updated workload classification. Therefore, the storage optimization system can recommend the selected potential configuration for the block storage volume.

Figure 5:
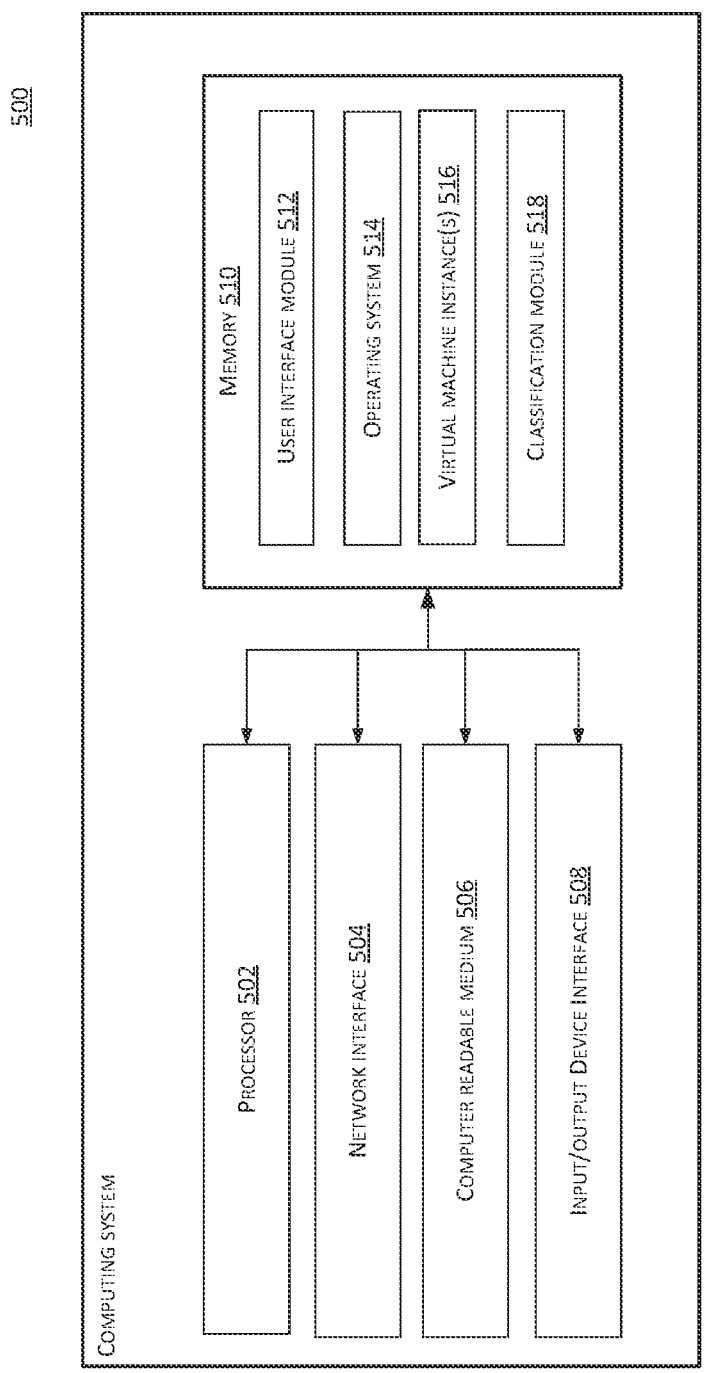
FIG. 5 shows an example computing device that may be used to implement aspects of the present disclosure.

FIG. 5 illustrates an example computing system 500 configured to execute the processes and implement the features described above. In some embodiments, the computing system 500 may include: one or more computer processors 502, such as physical central processing units ("CPUs"); one or more network interfaces 504, such as a network interface card ("NIC"); one or more computer readable medium drives 506, such as a high density disk ("IHDD"), a solid state drive ("SDD"), flash drives, and/or other persistent non-transitory computer-readable media; an input/output device interface 508, such as an input output ("IO") interface in communication with one or more microphones; and one or more computer readable memories 510, such as RAM and/or other volatile non-transitory computer-readable media.

The network interface 504 can provide connectivity to one or more networks or computing systems. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer readable memory 510, etc.

The computer readable memory 510 may include computer program instructions that the computer processor 502 executes in order to implement one or more embodiments. The computer readable memory 510 can store an operating system 514 that provides computer program instructions for use by the computer processor 502 in the general administration and operation of the computing system 500. The computer readable memory 510 can further include computer program instructions and other information for implementing aspects of the present disclosure. For example, in one embodiment, the computer readable memory 510 may include a user interface module 512. As another example, the computer-readable memory 510 may include VM instances 516. Further, for example, the computer-readable memory 510 may include a distribution module 518. In some embodiments, multiple computing systems 500 may communicate with each other via their respective network interfaces 504, and can implement multiple sessions each session with a corresponding connection parameter (e.g., each computing system 500 may execute one or more separate instances of the processes 400), in parallel (e.g., each computing system 500 may execute a portion of a single instance of the process 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electrically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    at least one server configured to store a block storage volume, the block storage volume acting as a virtual storage drive for a virtual machine instance and hosting a workload for the virtual machine instance, the block storage volume associated with a first performance consistency and a first durability; and
    a computing system in communication with the at least one server over a network, wherein the computing system is configured to:

obtain a set of workload parameters for the block storage volume, the set of workload parameters identifying the workload hosted by the block storage volume for the virtual machine instance;

obtain a plurality of workload classifications, wherein each of the plurality of workload classifications correlate a particular set of workload parameters, a particular performance consistency, and a particular durability;

based at least in part on the set of workload parameters, determine the block storage volume corresponds to a first workload classification of the plurality of workload classifications, wherein the first workload classification correlates the set of workload parameters and a second performance consistency and a second durability;

compare the first performance consistency with the second performance consistency and the first durability with the second durability;

identify a misconfiguration, the misconfiguration based on one or more of:
the second performance consistency exceeding the first performance consistency, or
the second durability exceeding the first durability;

based at least in part on identifying the misconfiguration, generate a recommendation to modify the block storage volume to match the second durability and the second performance consistency; and transmit the recommendation to a user.

2. The system of claim 1, wherein one or more workload parameters of the set of workload parameters comprise a volume configuration, a volume type, a tag, a volume size, input/output operations per second per volume, a number of pending input/output operations, or throughput.

3. The system of claim 1, wherein the computing system is further configured to:
determine the user rejected the recommendation;
based at least in part on determining the user rejected the recommendation, decrease a correlation between the set of workload parameters and the second durability and the second performance consistency, wherein the correlation corresponds to a weight;
based at least in part on determining the user rejected the recommendation, determine a third durability and a third performance consistency for the first workload classification, wherein one or more of:
the third durability and the second durability comprise different durabilities, or
the third performance consistency and the second performance consistency comprise different performance consistencies;
generate a second recommendation for the user to modify the block storage volume based on the third durability and the third performance consistency; and
transmit the second recommendation to the user.

4. The system of claim 1, wherein the computing system is further configured to:
determine the user accepted the recommendation; and
based at least in part on determining the user accepted the recommendation, increase a correlation between the set of workload parameters and the second durability and the second performance consistency, wherein the correlation corresponds to a weight.

5. A computer-implemented method facilitating interaction between a compute instance and a block storage volume, wherein the block storage volume acts as a virtual storage drive for the compute instance, the block storage volume associated with a first set of volume characteristics, the computer-implemented method comprising:

obtaining a set of workload parameters for the block storage volume, the set of workload parameters identifying a workload hosted by the block storage volume for the compute instance;

based at least in part on the set of workload parameters, determining the block storage volume corresponds to a first workload classification of a plurality of workload classifications, wherein the first workload classification correlates the set of workload parameters and a second set of volume characteristics;

comparing the first set of volume characteristics to the second set of volume characteristics; and based at least in part on comparing the first set of volume characteristics to the second set of volume characteristics, generating a recommendation for the block storage volume, wherein the block storage volume, the virtual storage drive for the compute instance, or the first workload classification is modified based at least in part on the recommendation or a subsequent recommendation for the block storage volume.

6. The computer-implemented method of claim 5 further comprising:
based at least in part on generating the recommendation, obtaining a second block storage volume with the second set of volume characteristics;
detaching the block storage volume and the compute instance; and
attaching the second block storage volume and the compute instance, the second block storage volume acting as the virtual storage drive for the compute instance.

7. The computer-implemented method of claim 5, wherein one or more of the first set of volume characteristics or the second set of volume characteristics comprise one or more of a measure of durability or a measure of performance consistency.

8. The computer-implemented method of claim 5, wherein one or more workload parameters of the set of workload parameters comprise a volume configuration, a volume type, a tag, a volume size, input/output operations per second per volume, a number of pending input/output operations, or throughput.

9. The computer-implemented method of claim 5 further comprising:
transmitting the recommendation to a user, wherein the recommendation comprises recommending to modify the block storage volume according to the second set of volume characteristics;
determining the user rejected the recommendation;
based at least in part on determining the user rejected the recommendation, determining a third set of volume characteristics for the first workload classification, wherein the third set of volume characteristics and the second set of volume characteristics comprise different volume characteristics;
generating a second recommendation for the user to modify the block storage volume based on the third set of volume characteristics, wherein the second recommendation comprises the subsequent recommendation; and
transmitting the second recommendation to the user.

10. The computer-implemented method of claim 5 further comprising:

transmitting the recommendation to a user, wherein the recommendation comprises recommending to modify the block storage volume according to the second set of volume characteristics;
determining the user accepted the recommendation; and
based at least in part on determining the user accepted the recommendation, increasing a correlation between the set of workload parameters and the second set of volume characteristics, wherein the correlation corresponds to a weight.

11. The computer-implemented method of claim 5 further comprising:
transmitting the recommendation to a user, wherein the recommendation comprises recommending to modify the block storage volume according to the second set of volume characteristics;
determining the user rejected the recommendation; and
based at least in part on determining the user rejected the recommendation, decreasing a correlation between the set of workload parameters and the second set of volume characteristics, wherein the correlation corresponds to a weight.

12. The computer-implemented method of claim 5, wherein the plurality of workload classifications are user specific.

13. The computer-implemented method of claim 5, wherein each workload classification of the plurality of workload classifications is associated with a particular weight, the particular weight weighing a correlation between a particular set of workload parameters and a particular set of volume characteristics.

14. The computer-implemented method of claim 5 further comprising:
building the plurality of workload classifications using training data, the training data corresponding to a plurality of block storage volumes and whether a particular recommendation is accepted or rejected for a particular block storage volume of the plurality of block storage volumes.

15. The computer-implemented method of claim 5 further comprising:
identifying the plurality of workload classifications based at least in part on one or more clustering algorithms, wherein the set of workload parameters comprise one or more of a workload type, a workload environment, a number of users, a latency, or input/output operations per second.

16. The computer-implemented method of claim 15, wherein the one or more clustering algorithms define a range of workload parameters, wherein the range of workload parameters comprise the set of workload parameters.

17. The computer-implemented method of claim 15, wherein the first workload classification corresponds to a plurality of sets of volume characteristics, the method further comprising determining a confidence of the second set of volume characteristics based at least in part on a proportion of the first workload classification associated with the second set of volume characteristics.

18. The computer-implemented method of claim 17, wherein determining the confidence is based at least in part on Bayes rule.

19. The computer-implemented method of claim 17, further comprising:
determining a confidence threshold based at least in part on feedback from one or more other users; and
determining the confidence satisfies the confidence threshold;
wherein generating the recommendation for the block storage volume is based at least in part on determining the confidence satisfies the confidence threshold.

20. The computer-implemented method of claim 5, wherein the recommendation comprises:
recommending to modify the block storage volume according to the second set of volume characteristics; or
recommending to maintain the block storage volume according to the first set of volume characteristics.

21. The computer-implemented method of claim 5 further comprising:
based at least in part on generating the recommendation for the block storage volume, modifying the block storage volume to match the second set of volume characteristics, wherein modifying the block storage volume to match the second set of volume characteristics comprises one or more of:
replicating the block storage volume;
removing a first replica of the block storage volume; or
transferring a second replica of the block storage volume from a first availability zone to a second availability zone.

22. One or more non-transitory computer-readable media comprising instructions executable by a device facilitating interaction between a compute instance and a block storage volume, wherein the block storage volume acts as a virtual storage drive for the compute instance, the block storage volume associated with a first set of volume characteristics, and wherein the instructions, when executed, cause the device to:
obtain a set of workload parameters for the block storage volume, the set of workload parameters identifying a workload hosted by the block storage volume for the compute instance;
determine the set of workload parameters corresponds to a second set of volume characteristics;
compare the first set of volume characteristics to the second set of volume characteristics; and
based at least in part on comparing the first set of volume characteristics to the second set of volume characteristics, modify the block storage volume.

23. The one or more non-transitory computer-readable media of claim 22, wherein the instructions further cause the device to:
based at least in part on the set of workload parameters, determine the block storage volume corresponds to a first workload classification of a plurality of workload classifications, wherein the first workload classification correlates the set of workload parameters and the second set of volume characteristics.

* * * * *